United States Patent Office
3,663,479
Patented May 16, 1972

3,663,479
EXTENDED-SURFACE DISPERSIBLE HYDROGENATION CATALYST AND PROCESS FOR PRODUCING SAME
Norman V. Lovegren, Marie S. Gray, and Reuben O. Feuge, New Orleans, La., assignors to the United States of America as represented by the Secretary of Agriculture
No Drawing. Filed June 24, 1970, Ser. No. 49,555
Int. Cl. C11c 3/12
U.S. Cl. 252—429
10 Claims

ABSTRACT OF THE DISCLOSURE

Nylon is dissolved in an aqueous solution of formic acid, or dissolved in a primary solvent such as ortho-phosphoric acid, meta-cresol, or phenol, in conjunction with ethyl alcohol as a secondary solvent, then precipitated in microscopic-sized particles by the addition of water. The precipitated nylon particles are washed with water until free of solvent. The nylon particles are mixed with an aqueous solution of a platinum (or palladium) compound, stirred and heated, thereby producing an easily dispersed hydrogenation catalyst of high surface area that is useful for selectively hydrogenating unsaturated fatty esters.

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for producing precious-metal catalysts that are useful in the hydrogenation of unsaturated fatty acid esters. Particularly, this invention relates to supported precious-metal catalysts of high surface area and in a microscopic-size form, which form renders the hydrogenation of unsaturated fatty acid esters selective and efficient. More particularly, this invention relates to the process for producing microscopic-size nylon particles on which are adsorbed submicroscopic portions of catalytic metals that are active in the hydrogenation of unsaturated fatty acid groups. The catalysts of this process are readily removed from the product and the precious metals of the spent catalyst can be easily recovered.

A catalyst is a substance that changes the rate of a chemical reaction. The specific properties of the catalyst surface determine the rate at which the reaction progresses. For a given reactant there are sometimes several reaction paths, and the type of catalyst used may determine which path is taken. The process by which a particular metal catalyst, either supported or unsupported, is prepared affects both the degree of catalytic activity and its selectivity in directing a specific reaction.

According to G. O. Bond in Catalyst by Metals, Academic Press, 1962, pp. 38–41, when a metal is supported on the surface of a carrier, the physical and mechanical properties of the resulting catalyst are superior to those of the unsupported metal. The degree of improvement resulting from the use of a carrier is generally thought to be determined by its physical rather than its chemical character; the manner in which the metal and the carrier are brought together is, however, very important. Supported metal catalysts are prepared by three distinct techniques: (1) impregnation, (2) coprecipitation, and (3) deposition; and there are substantial differences in the physical and mechanical properties between catalysts made by these three techniques. Supported catalysts made by the impregnation and deposition methods will have the active component readily available at the surface of the carrier, while in a supported catalyst made by coprecipitation some of the active component may be embedded within the carrier and, hence, not accessible. The activity of the catalyst can be changed by changing the carrier, and sometimes a change in carrier will also change its specific directing influence. There are two alternative views as to the role played by the carrier. One view is that the chemical and catalytic properties of the metal are influenced by the chemical nature of the support in a subtle and hitherto-unsuspected way, and so the support is often also acting as a promoter. The other view is that the presence of the metal on the carrier by some means activates the carrier so that it can participate in the catalysis. It is envisaged that adsorbed species may migrate from the metal to the carrier and there react in a manner naturally determined by the chemical nature of the carrier. Thus, the activity and the specificity of the catalyst would vary from one carrier to another.

The preparation of metal catalysts and their use in the hydrogenation of unsaturated fats and oils, as well as ethylenic compounds, unsaturated alcohols, acids, unsaturated hydrocarbons and many other compounds, has been known to those skilled in the art. Natural fats can be hardened by the hydrogenation of some of the double bonds, thus converting liquid fats to solid fats of varying degrees of hardness.

The addition of hydrogen to the double bonds requires the presence of a suitable catalyst, usually a finely divided metal or metallic oxide such as nickel, platinum, palladium, or various other metals. The metal catalyst may also be precipitated or adsorbed on a support of high surface area such as diatomaceous earth (kieselguhr) or finely divided, activated charcoal as well as numerous other materials. Hydrogenation appears to depend upon the adsorption of the hydrogen and the reactive double bond positions of the substance to be hydrogenated onto the active surface of the catalyst.

The catalytic activity of a given metal increases with increased surface area per unit weight. Also, the degree of catalytic activity depends on the particular metal used; platinum and palladium catalysts being more active than those prepared from nickel and chromium. When the catalyst is supported on an inert carrier, it is well dispersed and the accessible area of the metal is larger than when unsupported. Dispersion of the metal on a support inhibits crystal growth by sintering, thus extending the useful life of the catalyst.

The activity and selectivity in a given hydrogenation reaction depend not only on the type of catalyst but also on the conditions used, such as temperature, pressure, ratio of catalyst to substrate, and rate of agitation. In the production of hydrogenated fats and oils, the catalyst and the hydrogenation conditions are selected so that the desired reactions take place to produce a product of specific characteristics. Much of the hydrogenated oils produced commercially is used as shortening or margerine, and the catalyst and hydrogenation conditions are selected to give a plastic-type product havingg characteristics similar to lard in the case of shortening, and to butter in the case of margerine. Specality-type hard fats of short melting range require a catalyst of greater selectivity than that required for the hydrogenation of the more plastic products.

The nylon-supported platinum and palladium catalysts that we have prepared are active catalysts for the hydrogenation of fats and oils. These nylon-supported metal catalysts exhibit selectivity and are easily removed from the hydrogenated product without the need of filter aids to retain the fine particles. The precious metals can be easily recovered from the spent catalyst.

Catalysts prepared by adsorbing platinum or palladium on cut nylon fiber supports did not catalyze any apparent hydrogenation of unsaturated fatty esters. Evidently, the surface area of the nylon fibers per unit weight is insufficient to give a practical hydrogenation catalyst. To increase the surface area of the nylon support, it would be advantageous to have the nylon support in fine particles of high surface area so that the metal catalyst is sufficiently dispersed to give good catalytic activity, but coarse enough to be filtered out of the hydrogenated product by normal filtration procedures.

PREPARATION OF THE FINELY DIVIDED NYLON SUPPORT FOR THE CATALYST

The process utilizing formic acid as the nylon solvent

In our invention, we produce nylon particles of a size smaller than cut fibers by dissolving nylon in formic acid, then slowly adding water with mixing so that the nylon will precipitate out of the solution in a finely divided form. Once sufficient water has been added to ensure complete precipitation of the nylon from the formic acid solution, additional water is added to dilute the acid. The acidic water is removed from the precipitated nylon and the nylon is washed with sufficient water to ensure that the nylon particles are free of formic acid. The nylon particles produced under these conditions are of sufficient size to be retained by a medium porosity sintered glass filter (nominal maximum pore size 10–15 microns).

Several factors affect the size of the nylon particles produced by the process of our invention. These factors are (1) the ratio of nylon to formic acid, (2) the rate of addition of water to the nylon solution, (3) the speed of mixing, (4) the temperature of the nylon-formic acid solution, and (5) the order of combining the ingredients.

In reference to the ratio of nylon to formic acid, the addition of water to a solution of 1 gm. of nylon in 40 ml. of 90% formic acid consistently produced nylon particles of a suitable size. The concentration of the aqueous formic acid solution used to dissolve the nylon is not critical other than that the aqueous solution contain no less than about 67% formic acid by weight, such as is necessary to dissolve the nylon completely. A 1:50 ratio of nylon to formic acid had no advantage over a 1:40 ratio in the quality of the precipitated nylon particles. When water was added to a 1:20 ratio of nylon to formic acid the size of the precipitated nylon particles varied considerably. The addition of water to a 1:10 ratio of nylon to formic acid produced a dense, granular precipitate that was coarser than desired.

In reference to the rate of addition of water to the nylon solution, the rate at which water is added to the nylon-formic acid solution greatly influences the particle size of the precipitated nylon. A slow rate of addition of water to the nylon-formic acid solution with good stirring will produce small nylon particles of a suitable size for use as a catalyst support. The rapid addition of water to the nylon-formic acid solution will produce a very fine precipitate that passes through a medium porosity sintered glass filter (nominal maximum pore size 10–15 microns).

In reference to the speed of mixing, vigorous stirring of the nylon solution during the addition of water will produce a fine precipitate that passes through a medium porosity sintered glass filter (nominal maximum pore size 10–15 microns). Minimum stirring will produce nylon particles of irregular sizes. Optimum stirring appears to be that which is sufficiently vigorous to disperse the water to the extent that the nylon will not precipitate in just one area.

In reference to the temperature of the nylon-formic acid solution, most of the nylon supports were precipitated with the nylon-formic acid solution and the water at room temperature (about 24° C.). In one instance the nylon-formic acid solution was held at about 70° C. during the addition of water at ambient temperature. This procedure produced some fine nylon particles that passed through a medium porosity glass filter. Thus, the higher temperature of the nylon-formic acid solution is less satisfactory for precipitating nylon particles of a suitable size than one at room temperature.

In reference to the order in which the ingredients are mixed, it is necessary that the water be added to the nylon-formic acid solution in order to obtain nylon particles of a suitable size. The rapid addition of the nylon-formic acid solution to water produces precipitated nylon in a form similar to a coarse felt mat, which is not readily dispersed.

The process utilizing other nylon solvents

The basic process for the production of a finely divided nylon support by the precipitation of finely divided nylon particles upon the addition of water to a nylon-formic acid solution is applicable to nylon solvents mentioned elsewhere in this specification. A slight modification of the process developed for use with the nylon-formic acid solution is desirable when primary solvents such as ortho-phosphoric acid, phenol, or meta-cresol are used to dissolve nylon.

The solution of nylon in ortho-phosphoric acid is too viscous for convenient handling. However, the viscosity of the nylon-phosphoric acid solution may be reduced by the use of a secondary solvent such as ethyl alcohol. Nylon solutions prepared with phenol or m-cresol form two-phase systems during the addition of water, to precipitate the finely divided nylon particles, when their solubility in water is exceeded. A secondary solvent may be used to overcome this water-solubility problem that exists with the nylon-phenol and nylon-m-cresol solutions.

The procedure for preparing finely divided nylon particles by precipitation of the nylon by water from a 85% orthophosphoric acid, or phenol, or m-cresol solution of nylon is to dissolve the nylon in one of the three above mentioned solvents. The dissolved nylon is then diluted with ethyl alcohol, or some other water-miscible solvent, which in itself may not dissolve the nylon but dilutes the nylon solution without causing precipitation of the nylon. Water is added to the solvent-diluted nylon solution to precipitate the nylon in finely divided particles. The nylon particles are separated from the water-solvent mixture, and the nylon is washed with sufficient water to ensure that the nylon particles are free of the solvents used to dissolve the nylon and to dilute the nylon solution.

PREPARATION OF THE HYDROGENATION CATALYST

The nylon-supported catalyst was prepared by treating the finely divided nylon support with a water-soluble platinum or palladium compound in this manner. A solution of water-soluble platinum (in another instance palladium) compound was added to the washed and filtered precipitated nylon. The nylon and the solution of metallic compound were stirred and heated to about 80° C. for periods of time varying from about 30 minutes, in one instance, and up to several hours, in another instance. The temperature in this step is not critical within a temperature range of about 70° C. and aobut 100° C. (maximum temperature limited because of the water in the metallic compound solution), the temperature being such that the metallic compound will adsorb on the nylon support. At this point some catalysts thus produced were reduced with hydrogen, others were filtered and washed before reduction with hydrogen, and yet others were filtered and washed with and reduced with hydrogen after their transfer to oil. All of these catalysts promoted various degrees of hydrogenation.

These nylon-supported catalysts are easily dispersed in oil or fat when added in a moist condition. The water remaining in the catalyst is removed under vacuum with a nitrogen sweep while the mixture is warmed slightly and stirred.

MICROSCOPIC EXAMINATION OF NYLON PARTICLES NYLON-SUPPORTED CATALYSTS AND MILLED NYLON FIBERS

Nylon particles (prepared by water precipitation from an aqueous formic acid solution), metal catalysts supported on these nylon particles, and finely cut nylon fibers (prepared in a Wiley mill) were examined under a microscope at ×100 magnification.

The size range of the precipitated nylon particles, both with and without the adsorbed metal catalyst, was 2 to 20 microns in diameter. Most of the particles were in the 7 to 20 micron diameter range although there was some variation in particle size from batch to batch. An examination of the nylon supported catalyst in a concentrated form in water showed clumps of about 60 to 80 microns in diameter. When the particles were examined in a dilute water suspension, the particles were found to be dispersed individually. The nylon-supported catalysts differed in appearance from the nylon support only in that the metal-adsorbed nylon particles were uniformly somewhat darker. Apparently, the metal was adsorbed onto the nylon in a submicroscopic form and no metal crystals were observed at ×100 magnification. Thus, the metal was widely dispersed on the nylon support to greatly extend the surface area of the metal, thereby increasing the catalytic activity of the metal per unit weight.

Nylon 66 fibers (Du Pont nylon 420, 2.61 denier) were cut in a Wiley mill (20 mesh screen) to increase the surface area. The cut nylon fibers, on microscopic examination, were found to vary from 16 to 23 microns in diameter and from 77 to 690 microns in length with a large number of fibers of the 450 to 690 length. Milling produces nylon fiber particles considerably larger than the dispersed nylon obtained by the precipitation process; thus it is doubtful that nylon fibers having a surface area comparable to that of the precipitated nylon can be obtained by milling or similar means of producing finely cut fibers.

The rate of hydrogenation depends on the following variable factors: (1) type of metal catalyst, (2) concentration of the active catalyst in the oil, (3) temperature, (4) hydrogen pressure, and (5) rate of stirring. The hydrogen pressure and the rate of stirring were constant in the several hydrogenations using nylon supported catalysts. Palladium, being a more active catalyst than platinum, hydrogenated fatty esters with a lower concentration of catalyst and at a lower temperature than was necessary for the platinum catalysts. The temperature used for the various catalysts was 55° C. to 110° C.; the temperature at which a particular hydrogenation was performed depended on the temperature at which the catalyst being used was active. Hydrogenation time varied from 1 hour and 22 minutes to 11 hours and 26 minutes. The rate at which the iodine value (I.V.) decreased ranged from 1.4 to I.V./hour to 15.3 I.V./hour.

The following examples will serve as illustrations of the procedure for the preparation of nylon-supported catalysts and their use in hydrogenating cottonseed oil and a cottonseed oil fraction, but it is understood that the invention is not limited thereto.

EXAMPLE 1

The dispersed nylon support was prepared by dissolving 2 gm. of nylon 66 fibers (Du Pont type 420) in about 80 ml. of 90% formic acid in a 400 ml. tall form beaker. About 100 ml. of water was added slowly (about 1 ml./min.) from a buret into the nylon-formic acid solution while stirring with a magnetic stirrer at a rate sufficient to dsiperse the added water quickly. The slow addition of the water at the beginning is critical in determining the type and size of the precipitated nylon produced. The precipitated nylon particles were separated from the formic acid solution by means of a medium porosity sintered glass filter (nominal maximum pore size 10–15 microns). The nylon was then washed with sufficient water to ensure that the nylon particles were free of formic acid.

EXAMPLE 2

The dispersed nylon support was prepared by dissolving 0.1 gm. nylon 66 fibers (Du Pont type 420) in 3.0 gm. of 85% ortho-phosphoric acid by stirring until the nylon was completely dissolved. The nylon-phosphoric acid solution was diluted with 10.1 gm. ethyl alcohol and mixed by stirring. The nylon was precipitated in the form of finely divided particles from the diluted solution by the slow addition of 80 ml. of water while stirring with a magnetic stirrer at a rate sufficient to disperse the added water quickly. The precipitated nylon particles were separated from the water-solvent mixture by means of a medium porosity sintered glass filter (nominal maximum pore size 10–15 microns). The nylon was then washed with sufficient water to ensure that the nylon particles were free of the solvents used to dissolve the nylon and to dilute the nylon solution.

EXAMPLE 3

The dispersed nylon support was prepared by dissolving 0.12 gm. nylon 66 fibers (Du Pont type 420) in 2.2 ml. of m-cresol by stirring until the nylon was completely dissolved. The nylon-m-cresol solution was diluted with 20 ml. ethyl alcohol and mixed by stirring. The nylon was precipitated in the form of finely divided particles from the diluted solution by the slow addition of 20 ml. of water while stirring at a rate sufficient to disperse the added water quickly, additional water being added more rapidly. The precipitated nylon particles were separated from the water-solvent mixture by means of a medium porosity sintered glass filter (nominal maximum pore size 10–15 microns). The nylon was then washed with sufficient water to ensure that the nylon particles were free of the solvents used to dissolve the nylon and to dilute the nylon solution.

EXAMPLE 4

Finely divided nylon particles were also prepared by dissolving nylon 66 fibers (Du Pont type 420) in phenol, diluting the nylon-phenol solution with ethyl alcohol, and precipitating the nylon particles from the diluted solution by water, the procedure using phenol being essentially the same as that used with m-cresol as the solvent for the nylon.

EXAMPLE 5

A platinum-nylon catalyst was prepared by heating the washed nylon prepared in Example 1 in the same 400 ml. beaker with an aqueous solution of chloroplatinic acid (0.1 gm. $H_2PtCl_6 \cdot 6H_2O$), and additional water to bring the volume of the mixture to about 50 ml., in a 90° C. water bath with stirring. In less than 3 hours the catalyst had become a blackish chocolate brown color and the supernatant liquid was clear and colorless. The water was removed from the catalyst with a medium porosity filter stick (nominal maximum pore size 10–15 microns).

EXAMPLE 6

One-fourth of the damp platinum-nylon catalyst prepared in Example 5 was transferred to a small round bottom flask containing 18 gm. freshly bleached cottonseed oil. The moisture remaining in the catalyst was removed under vacuum with a nitrogen sweep while the mixture was stirred and warmed slightly in a water bath. After removal of all the moisture, the gas over the oil was replaced by hydrogen. Normal hydrogenation of the cottonseed oil with the platinum-nylon catalyst proceeded at about 1 atmosphere pressure and 110° C. from an initial iodine value of about 113 to a final iodine value of about 64. Gas-liquid chromatographic (G.L.C.) values of the methyl esters of the cottonseed oil triglycerides gave the following results:

HYDROGENATION OF COTTONSEED OIL USING A PLATINUM-NYLON CATALYST

| Product | Fatty acid content, percent methyl esters | | | | |
|---|---|---|---|---|---|
| | Myristate | Palmitate | Stearate | Oleate | Linoleate |
| Initial | 0.7 | 22.3 | 2.1 | 16.1 | 58.8 |
| Final | 0.8 | 22.2 | 12.0 | 56.1 | 8.9 |

The content of trans-isomers in the final product was 34.4% as measured with Method Cd 14–61 of the American Oil Chemists' Society.

EXAMPLE 7

A second nylon supported catalyst was prepared by dissolving 2 gm. nylon 610 chips (Du Pont) in 80 ml. of 90% formic acid, then precipitating and washing the nylon as described in Example 1. The washed nylon was combined with an aqueous palladium solution (0.1 gm. $PdCl_2$) and heated in a water bath at about 90° C. with stirring for 6 hours; then the palladium chloride still remaining in solution was filtered off and the palladium-nylon catalyst was washed with a small amount of water.

EXAMPLE 8

One-fourth of the palladium-nylon catalyst prepared in Example 7 was used to hydrogenate 18 gm. of a purified dipalmito-unsaturated fraction obtained from a solvent-winterized cottonseed oil stearine. This fat was hydrogenated at about 1 atmosphere pressure and 55° C. from an initial iodine value of about 55.5 to a final iodine value of about 33.3. G.L.C. values of the methyl esters gave the following results:

HYDROGENATION OF A DIPALMITO COTTONSEED OIL FRACTION USING A PALLADIUM-NYLON CATALYST

| Product | Fatty acid content, percent methyl esters | | | | |
|---|---|---|---|---|---|
| | Myristate | Palmitate | Stearate | Oleate | Linoleate |
| Initial | 0.4 | 63.5 | 0.5 | 6.9 | 28.7 |
| Final | 0.1 | 63.5 | 2.3 | 29.7 | 4.5 |

The content of trans-isomers in the final product was 17.6%.

EXAMPLE 9

A third nylon supported catalyst was prepared using the precipitated and washed nylon prepared from nylon 610 chips as described in Example 7. The washed nylon was combined with an aqueous chloroplatinic acid solution (0.1 gm. $H_2PtCl_6 \cdot 6H_2O$) in a water bath at about 90° C. with stirring for about 3 hours. The chloroplatinic acid still remaining in solution (estimated about one-half) was filtered off and the catalyst was washed with a small amount of water.

EXAMPLE 10

One-half of the catalyst prepared in Example 9 (about 1 gm. dry weight) was used to hydrogenate 18 gm. of the purified dipalmito-unsaturated fraction from cottonseed oil stearine at about 1 atmosphere pressure and 110° C. from an initial iodine value of about 55.5 to a final iodine value of about 32.0. G.L.C. values of methyl esters gave the following results:

HYDROGENATION OF A DIPALMITO COTTONSEED OIL FRACTION USING A PLATINUM-NYLON CATALYST

| Product | Fatty acid content, percent methyl esters | | | | |
|---|---|---|---|---|---|
| | Myristate | Palmitate | Stearate | Oleate | Linoleate |
| Initial | 0.4 | 63.5 | 0.5 | 6.9 | 28.7 |
| Final | Trace | 63.5 | 4.8 | 26.2 | 5.5 |

The content of the trans-isomers in the final product was 15.2%.

SUMMARY

The instant invention can best be described as a supported, precious-metal, selective, hydrogenation catalyst, said catalyst being readily dispersible in the reaction medium, easily separable from the final product without the need of special filter aids, and potentially reusable, and the process for producing said catalyst can be best described as comprising the steps:

(a) Dissolving a quantity of nylon in a solvent selected from the group consisting of:

aqueous formic acid,
ortho-phosphoric acid,
meta-cresol, and
phenol, (b) Precipitating the nylon of solution (a) in the form of microscopic-sized particles by adding water to the said solution, (c) Water-washing the precipitated microscopic-sized nylon particles and separating the nylon from the water, (d) Mixing the nylon particles of (c) with an aqueous precious-metal solution, then heating and stirring the mixture for at least 30 minutes, and (e) Separating the precious-metal treated, microscopic-sized nylon particles from the precious metal solution and water-washing the portion containing the nylon particles, to produce an extended-surface, dispersible, supported, precious-metal, hydrogenation catalyst.

We claim:

1. A process for producing a supported, precious-metal, selective hydrogenation catalyst, said catalyst being readily dispersible in the hydrogenation reaction medium, easily separable from the hydrogenated final product without the need of special filter aids, and potentially reusable, said process comprising:

(a) dissolving a quantity of nylon in about from 20 to 50 times its weight of aqueous formic acid solvent, (b) adding very slowly to the solution from step (a) a quantity of water equal to about 50 times the weight of the nylon to precipitate the nylon in the form of microscopic-sized particles of about from 7 to 20 microns in diameter, (c) water-washing the precipitated microscopic-sized nylon particles from step (b) until free of solvent, and separating the nylon particles from the water, (d) mixing the separated nylon particles from step (c) with a sufficient quantity of a dilute water solution of a precious-metal compound selected from the group consisting of chloroplatinic acid and palladium chloride, such that the weight of the precious-metal compound is equal to about 0.2% of the weight of the nylon, (e) heating and stirring the mixture from step (d) for about from one-half to several hours at a temperature of about from 70° C. to no higher than about 100° C., and (f) separating, from the heated-and-stirred mixture of step (e), the microscopic-sized nylon particles, which contain the precious metal adhering to the surface of the particles, from residual precious-metal solution and water-washing same, thereby providing a supported, precious-metal, selective hydrogenation catalyst in the form of an extended-surface dispersible catalyst.

2. A process for producing a supported, precious-metal, selective hydrogenation catalyst, said catalyst being readily dispersible in the hydrogenation reaction medium, easily separable from the hydrogenated final product without the need of special filter aids, and potentially reusable, said process comprising:

(a) dissolving a quantity of nylon in about from 20 to 50 times its weight of a primary solvent selected from the group consisting of orthophosphoric acid, meta-cresol, and phenol, (b) adding ethyl alcohol to the solution from step (a) as a secondary solvent to reduce the viscosity and/or increase the mutual solubility with water, so as to prevent the formation of a liquid two-phase system when water is added, (c) adding very slowly to the mixture from step (b) a quantity of water equal to about 50 times the weight of the nylon to precipitate the nylon in the form of microscopic-sized particles of about from 7 to 20 microns in diameter, (d) water-washing the precipitated microscopic-sized nylon particles from step (c) until free of solvents, and separating the nylon particles from the water, (e) mixing the separated particles from step (d) with a sufficient quantity of a dilute water solution of a precious-metal compound selected from the group consisting of chloroplatinic acid and palladium chloride, such that the weight of the precious-metal compound is equal to about 0.2% of the weight of the nylon, (f) heating and stirring the mixture from step (e) for about from one-half to seevral hours at a temperature of about from 70° C. to no higher than about 100° C., and (g) separating from the heated-and-stirred mixture of step (f), the microscopic-sized nylon particles, which contain the precious metal adhering to the surface of the particles, from residual precious-metal solution and water-washing same, thereby providing a supported, precious-metal, selective hydrogenation catalyst in the form of an extended-surface dispersible catalyst.

3. The process of claim 2 wherein the primary solvent is ortho-phosphoric acid.

4. The process of claim 2 wherein the primary solvent is meta-cresol.

5. The process of claim 2 wherein the primary solvent is phenol.

6. The process of claim 1 wherein the precious-metal compound is chloroplatinic acid.

7. The process of claim 2 wherein the precious-metal compound is chloroplatinic acid.

8. The process of claim 1 wherein the precious-metal compound is palladium chloride.

9. The process of claim 2 wherein the precious-metal compound is palladium chloride.

10. A selective hydrogenation catalyst consisting of submicroscopic particles of a precious-metal compound selected from the group consisting of chloroplatinic acid and palladium chloride supported on the surface of nylon particles of about from 7 to 20 microns in diameter as a carrier therefor.

References Cited

UNITED STATES PATENTS

| | | | |
|---|---|---|---|
| 3,042,197 | 7/1962 | Binning et al. | 260—409 XR |
| 3,198,816 | 8/1965 | Zatcew | 260—409 |
| 3,489,778 | 1/1970 | Hof | 260—409 |
| 3,503,899 | 3/1970 | Hergenrother | 252—450 |
| 3,551,351 | 12/1970 | Murray et al. | 252—426 XR |

PATRICK P. GARVIN, Primary Examiner

U.S. Cl. X.R.

252—430; 260—409